United States Patent
Tsai et al.

(10) Patent No.: US 8,996,784 B2
(45) Date of Patent: *Mar. 31, 2015

(54) COMMAND CONTROLLER, PREFETCH BUFFER AND METHODS FOR ACCESSING A SERIAL FLASH IN AN EMBEDDED SYSTEM

(75) Inventors: Chung-Hung Tsai, Chu-Pei (TW); Ming-Shiang Lai, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 356 days.

This patent is subject to a terminal disclaimer.

(21) Appl. No.: 12/778,216

(22) Filed: May 12, 2010

(65) Prior Publication Data
US 2010/0235570 A1    Sep. 16, 2010

Related U.S. Application Data

(63) Continuation-in-part of application No. 11/371,423, filed on Mar. 9, 2006, now Pat. No. 7,743,202.

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC .... *G06F 12/0862* (2013.01); *G06F 2212/1004* (2013.01); *G06F 2212/1016* (2013.01); *G06F 2212/2022* (2013.01); *G06F 2212/6022* (2013.01)
USPC ............. 711/103; 711/E12.001; 711/E12.008

(58) Field of Classification Search
CPC ............... G06F 12/0862; G06F 2212/1004; G06F 2212/1016; G06F 2212/2022; G06F 2212/6022
USPC ........................... 711/103, E12.001, E12.008
See application file for complete search history.

(56) References Cited

U.S. PATENT DOCUMENTS

| | | | |
|---|---|---|---|
| 5,671,390 A * | 9/1997 | Brady et al. | 711/113 |
| 6,317,811 B1 | 11/2001 | Deshpande | |
| 6,684,294 B1 | 1/2004 | Huffman | |
| 6,714,993 B1 | 3/2004 | Bhaskaran | |
| 6,845,412 B1 * | 1/2005 | Boike et al. | 710/36 |
| 7,370,152 B2 | 5/2008 | Woo et al. | |
| 7,543,114 B2 * | 6/2009 | Cho | 711/137 |
| 7,743,202 B2 * | 6/2010 | Tsai et al. | 711/103 |
| 2002/0023194 A1 | 2/2002 | Fukuhisa et al. | |

(Continued)

FOREIGN PATENT DOCUMENTS

TW    1224748    12/2004

OTHER PUBLICATIONS

English language translation of abstract of TW 1224748 (published Dec. 1, 2004).

*Primary Examiner* — Sheng-Jen Tsai
(74) *Attorney, Agent, or Firm* — McClure, Qualey & Rodack, LLP

(57) ABSTRACT

The invention relates to a command controller and a prefetch buffer, and in particular, to a command controller and a prefetch buffer for accessing a serial flash in an embedded system. An embedded system comprises a serial flash, a processor, a plurality of access devices, and a prefetch buffer. The processor and the plurality of access devices send various commands to read data from or write data to the serial flash. The prefetch buffer temporarily stores a predetermined amount of data before data being read from or written to the serial flash.

17 Claims, 11 Drawing Sheets

(56) References Cited

U.S. PATENT DOCUMENTS

| | | |
|---|---|---|
| 2002/0056027 A1* | 5/2002 | Kanai et al. .................. 711/137 |
| 2002/0091916 A1 | 7/2002 | Dowling |
| 2002/0118204 A1* | 8/2002 | Aleksic et al. ............... 345/544 |
| 2002/0188821 A1* | 12/2002 | Wiens et al. ................. 711/220 |
| 2003/0204675 A1* | 10/2003 | Dover et al. ................. 711/137 |
| 2004/0054883 A1 | 3/2004 | Goodman et al. |
| 2004/0139259 A1* | 7/2004 | Mantey et al. ............... 710/113 |
| 2004/0148482 A1* | 7/2004 | Grundy et al. ............... 711/167 |
| 2004/0230738 A1 | 11/2004 | Lim et al. |
| 2004/0243872 A1 | 12/2004 | Tu et al. |
| 2005/0041478 A1 | 2/2005 | Matsushita et al. |
| 2005/0050283 A1* | 3/2005 | Miller et al. ................. 711/150 |
| 2005/0120146 A1* | 6/2005 | Chen et al. .................... 710/22 |
| 2005/0188121 A1* | 8/2005 | Cho .............................. 710/22 |
| 2006/0069822 A1* | 3/2006 | Moriwaki et al. .............. 710/71 |
| 2006/0248267 A1* | 11/2006 | Xie .............................. 711/103 |
| 2007/0005902 A1 | 1/2007 | Petersen |
| 2008/0028119 A1* | 1/2008 | Randell et al. ................ 710/307 |
| 2011/0066837 A1* | 3/2011 | Lee et al. ......................... 713/2 |

* cited by examiner

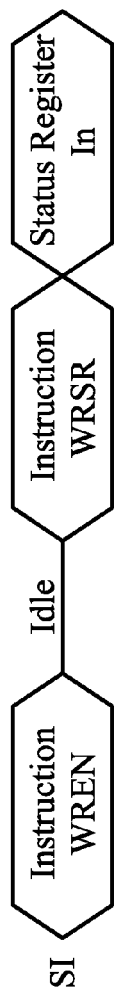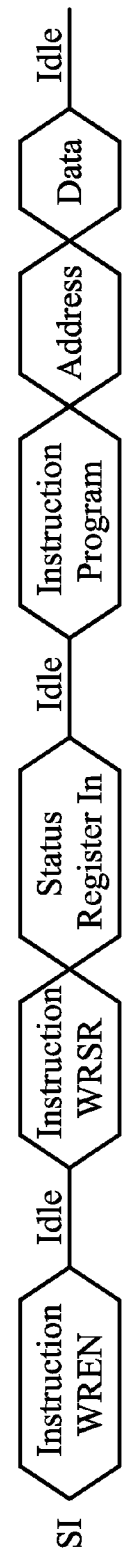
FIG. 4D
FIG. 4E

COMMAND CONTROLLER, PREFETCH BUFFER AND METHODS FOR ACCESSING A SERIAL FLASH IN AN EMBEDDED SYSTEM

CROSS REFERENCE TO RELATED APPLICATIONS

This application is a Continuation-in-Part of U.S. patent application Ser. No. 11/371,423, filed Mar. 9, 2006, and entitled "COMMAND CONTROLLER, PREFETCH BUFFER AND METHODS FOR ACCESSING A SERIAL FLASH IN AN EMBEDDED SYSTEM", which is incorporated herein for reference.

BACKGROUND

The invention relates to a command controller and a prefetch buffer, and in particular, to a command controller and a prefetch buffer for accessing a serial flash in an embedded system.

Embedded systems typically comprise flash memory such as serial flash or parallel flash for storing data and code. An embedded system requires a plurality of pins (address pins, data pins, and control pins) to access a parallel flash. Fewer pins are required to access a serial flash. For example, an embedded system only requires four pins (an enabling pin CE, a clock pin SCLK, a data input pin SI, and a data output pin SO) to access the serial flash. Additional commands and addresses, however, must be issued each time the serial flash is accessed. Performance suffers from disadvantages when the large number of additional commands and addresses are issued due to frequently access. Additionally, the serial flash is controlled by vendor specific instructions, which vary between manufacturers, resulting in compatibility problems.

SUMMARY

An object of the invention is to provide a command controller applied in an embedded system. The embedded system comprises a processor, a plurality of access devices and a serial flash. The processor and the plurality of access devices send various commands to read data from or write data to the serial flash. The command controller comprises a direct reader and a command interpreter. The direct reader processes a first command to generate a first instruction according to a trapping input wherein the first command can be from the processor or any access device and the first instruction is shifted to the serial flash for reading data in the serial flash. The command interpreter interprets a second command to generate a second instruction according to the trapping input wherein the second command is from the processor and the second instruction is shifted to the serial flash for reading data from or writing data to the serial flash.

Another object of the invention is to provide a prefetch module applied in an embedded system. The embedded system comprises a processor, a plurality of access devices and a serial flash. The processor and the plurality of access devices send various commands to read data from or write data to the serial flash. The prefetch module comprises a command interpreter and a prefetch buffer. The command interpreter interprets a second command to generate a second instruction wherein the second command is from the processor and the second instruction is shifted to the serial flash for reading data from or writing data to the serial flash. The prefetch buffer temporarily stores a predetermined amount of data before data being read from or written to the serial flash.

A further object of the invention is to provide an embedded system. The embedded system comprises a serial flash, a processor, a plurality of access devices, and a command controller. The processor and the plurality of access devices send various commands. The command controller processes the various commands to generate and send various instructions to the serial flash to read data from or write data to the serial flash.

A further object of the invention is to provide an embedded system. The embedded system comprises a serial flash, a processor, a plurality of access devices, and a prefetch buffer. The processor and the plurality of access devices send various commands to read data from or write data to the serial flash. The prefetch buffer temporarily stores a predetermined amount of data before data being read from or written to the flash.

A further object of the invention is to provide a method of controlling a command controller applied in an embedded system. The method comprises: processing a first command from a processor to generate a first instruction according to a trapping input and shifting the first instruction to the serial flash for reading data; and interpreting a second command from the processor or any access device to generate a second instruction according to the trapping input and shifting the second instruction to the serial flash for reading or writing data.

A further object is to provide a method of controlling a prefetch buffer applied in an embedded system. The method comprises: continually storing data in the prefetch buffer until the prefetch buffer is full, and transmitting data from/to the serial flash.

A further object is to provide an embedded system. The embedded system comprises a processor, an access device and a serial flash, wherein the processor and the access device send commands to read data from or write data to the serial flash. The embedded system further comprises a command interpreter, a direct reader and a prefetch buffer. The command interpreter is coupled to the processor via a first bus, and operative to interpret a first command to generate a first instruction, wherein the first command is from the processor. The direct reader is coupled to the processor and the access device via a second bus, operative to process a second command to generate a second instruction, wherein the second command can be from at least one of the processor and the access device. The prefetch buffer is operative to temporarily store data before data read from the serial flash is received by the processor or the access device and/or before data is written to the serial flash. The first instruction and the second instruction are shifted to the serial flash for accessing the serial flash.

Yet another object is to provide an embedded system comprising a processor and a serial flash, wherein the processor reads data from or writes data to the serial flash. The embedded system further comprises: a direct reader implemented by hardware, coupled to the processor and operative to implement a read command for the processor.

DESCRIPTION OF THE DRAWINGS

The following detailed description, given by way of example and not intended to limit the invention solely to the embodiments described herein, will best be understood in conjunction with the accompanying drawings, in which:

FIGS. 4B~4E show schematic diagrams of a series of instructions, data, and address sent to the serial flash 110 different operations of the command controller;

DESCRIPTION OF THE INVENTION

Figure 1:
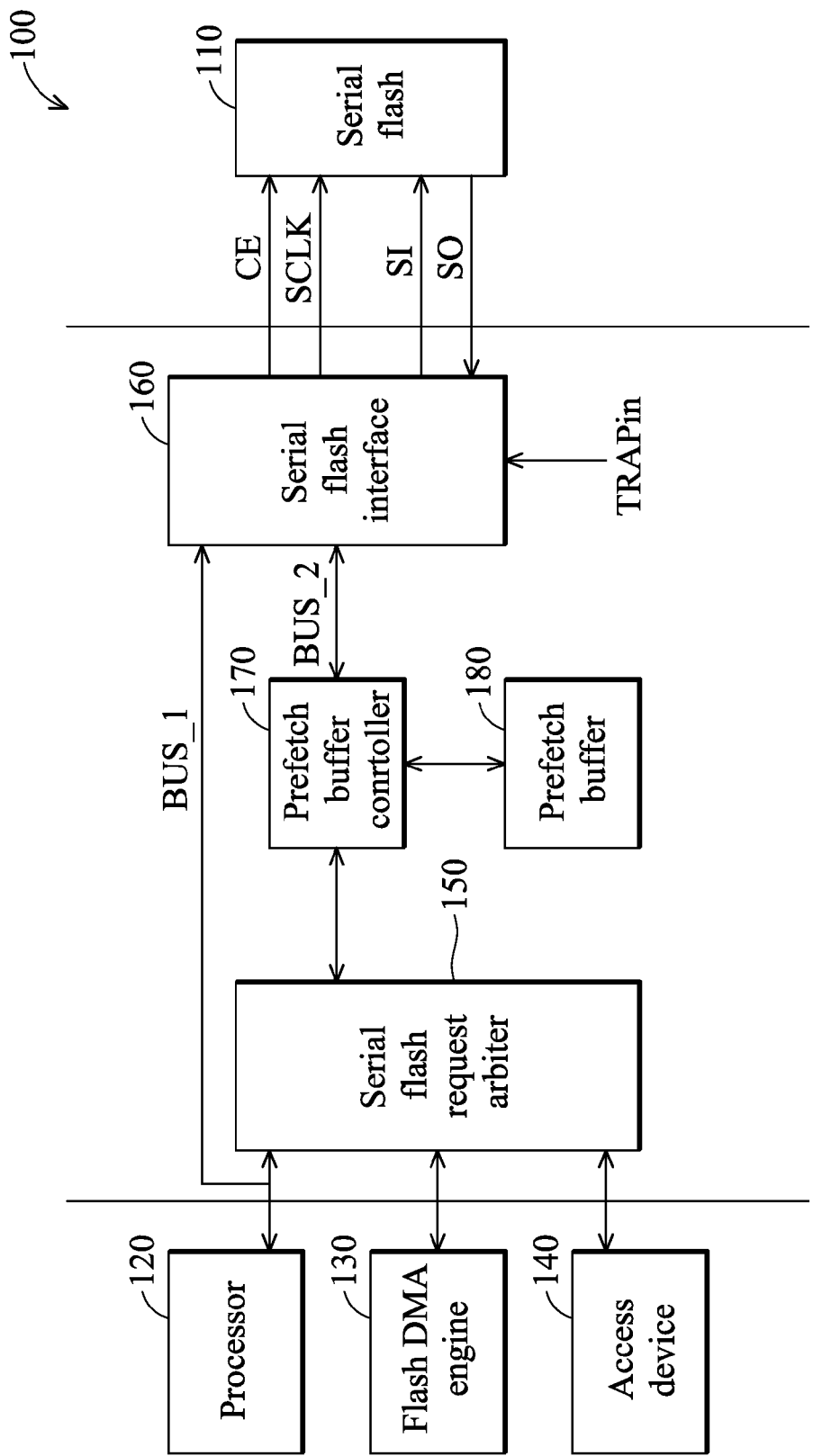
FIG. 1 shows a block diagram of an embedded system according to an embodiment of the invention.

A detailed description of the invention is provided in the following. Please refer to FIG. 1. FIG. 1 shows a block diagram of an embedded system 100 according to one embodiment of the invention. The embedded system 100 comprises a serial flash 110, a processor 120, a flash DMA engine 130, an access device 140, a serial flash request arbiter 150, a serial flash interface 160, a prefetch buffer controller 170 and a prefetch buffer 180. The processor 120, flash DMA engine 130, and access device 140 can access the serial flash 110. For example, the processor 120 can read/write the serial flash 110 and the flash DMA engine 130 can move data in the serial flash 110 to a DRAM (not shown). If there are more than two elements requesting access to the serial flash 110 at the same time, the serial flash request arbiter 150 chooses one element to send a command through the bus BUS_2 to access the serial flash 110. Additionally, the command can be issued by the processor 120 directly through the bus BUS_1 without going through bus BUS_2. The prefetch buffer controller 180 is utilized to collect and translate several single read access requests to the burst read access for reducing total access time. A detailed description of reducing access time through the prefetch buffer controller 180 will be described later and access to the serial flash is provided in the following.

Figure 2A:
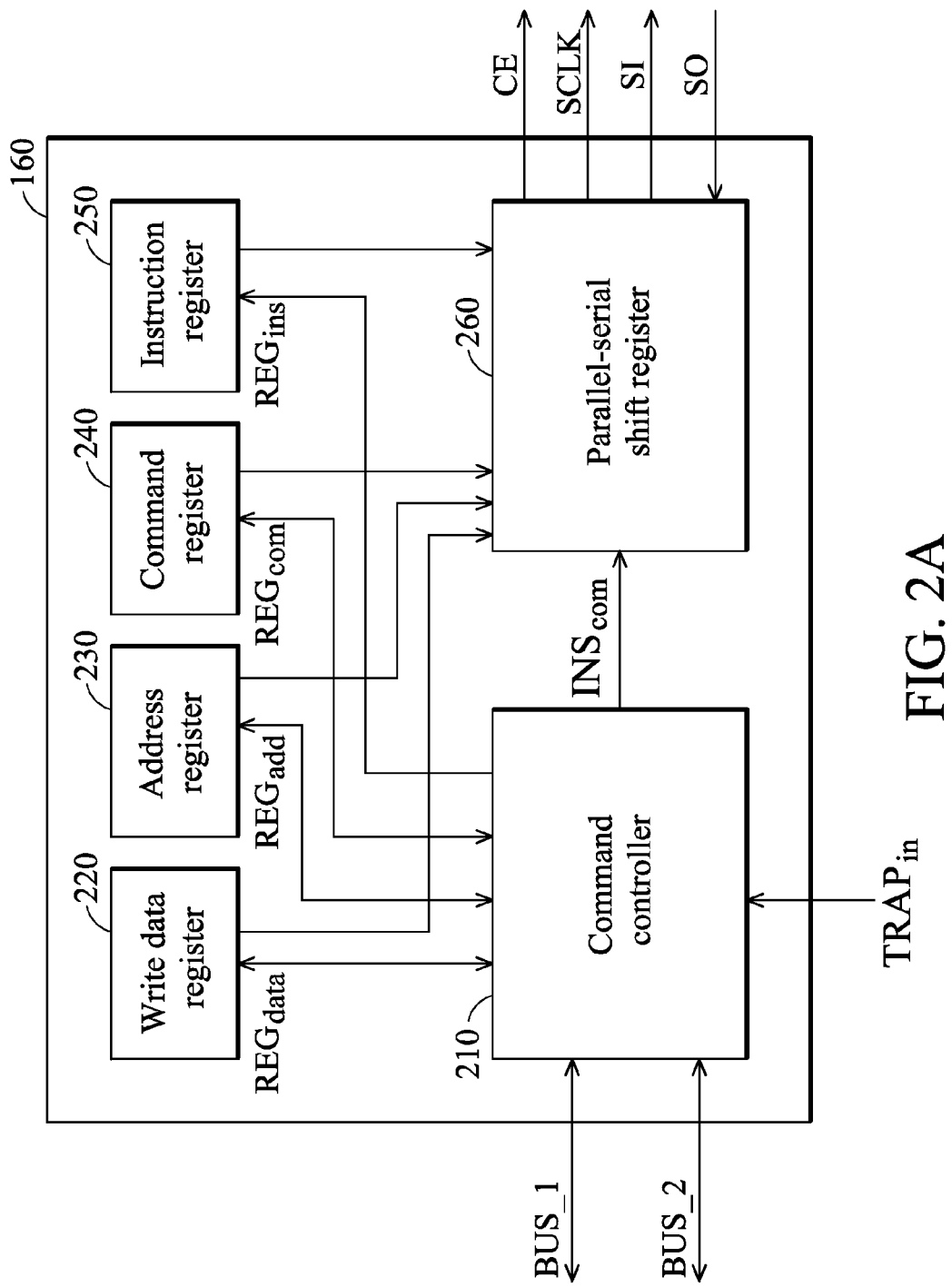
FIG. 2A shows a block diagram of the serial flash interface.

Please refer to FIG. 2A. FIG. 2A shows a block diagram of the serial flash interface 160. The serial flash interface 160 comprises a command controller 210, a write data register 220, an address register 230, a command register 240, an instruction register 250 and a parallel-serial shift register 260. The command controller 210 interprets the flash command (access command $COM_{access}$ from bus BUS_1 or direct command $COM_{write}$/$COM_{read}$ from bus BUS_2) to the flash instruction by the help of the plurality of registers and trapping input TRAPin. Finally the parallel-serial shift register 260 converts the instruction from a parallel form to a serial form and shifts the instruction to the serial flash 110 (in FIG. 1). A detailed description of access command interpreting process is provided in the following.

Figure 2B:
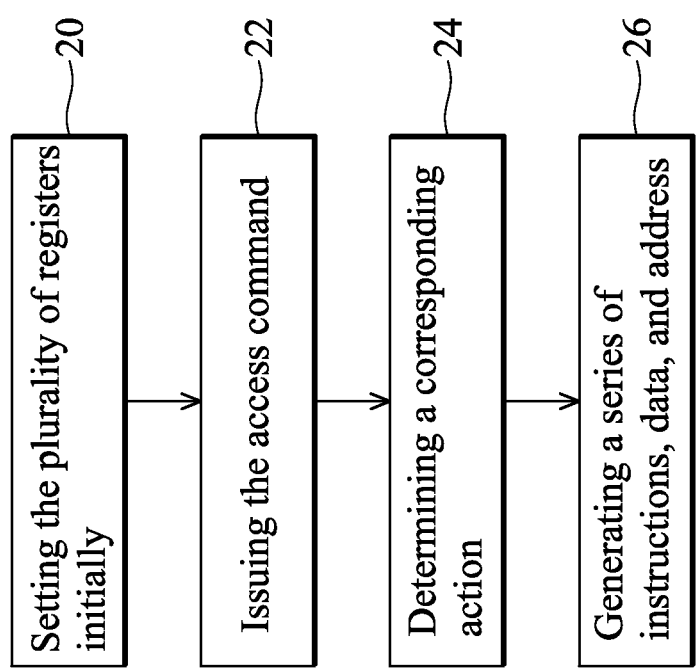
FIG. 2B is a flow chart of access command interpreting process.

Please refer to FIG. 2B. FIG. 2B is a flow chart of access command interpreting process. Steps of the process are given in the following:

Step 20: The processor 120 sets the plurality of registers 220-250 through the bus BUS_1 initially.

Step 22: The access command $COM_{access}$ is issued from the processor 120 to the command controller 210 through the bus BUS_1.

Step 24: A corresponding action (e.g. bulk erase, byte read, byte write . . . ) is determined according to the value of command register 240, which is set in the previous step 20.

Step 26: The command controller 210 performs interpretation to generate a series of instructions, data, and address. For example, in the case of byte write action, vendor-dependent instruction is generated first, data to be written and writing address are generated in turn. Please note that the vendor-dependent instruction is generated according to the instruction register 250, data written to the serial flash 110 is temporarily stored in the write data register 220, and the writing address is temporarily stored in the address register 230.

Further discussion of the instruction register 250 is provided in the following. There are various kinds of instruction register implementation. Please note that the implementation of instruction register is only meant to serve as an example, and is not meant to be taken as a limitation. For example, if the space of instruction register is large enough to store the whole instruction sets of a specific serial flash vendor, the instruction register 250 does not need to be set (or initialized) each time of command interpreting process. Otherwise, the instruction register 250 needs to be reset (or re-initialized) each time of command interpreting process. Additionally, different serial flash vendor provides different instruction sets, thus, the instruction register 250 needs to further update its content if the vendor of serial flash changes. Similarly, if the space of the instruction register 250 is large enough to store a plurality of instruction sets corresponding to different serial flash vendor, the instruction register 250 can simply provide the instruction set of current vendor according to the trapping input $TRAP_{in}$ rather than reset again.

Figure 3A:
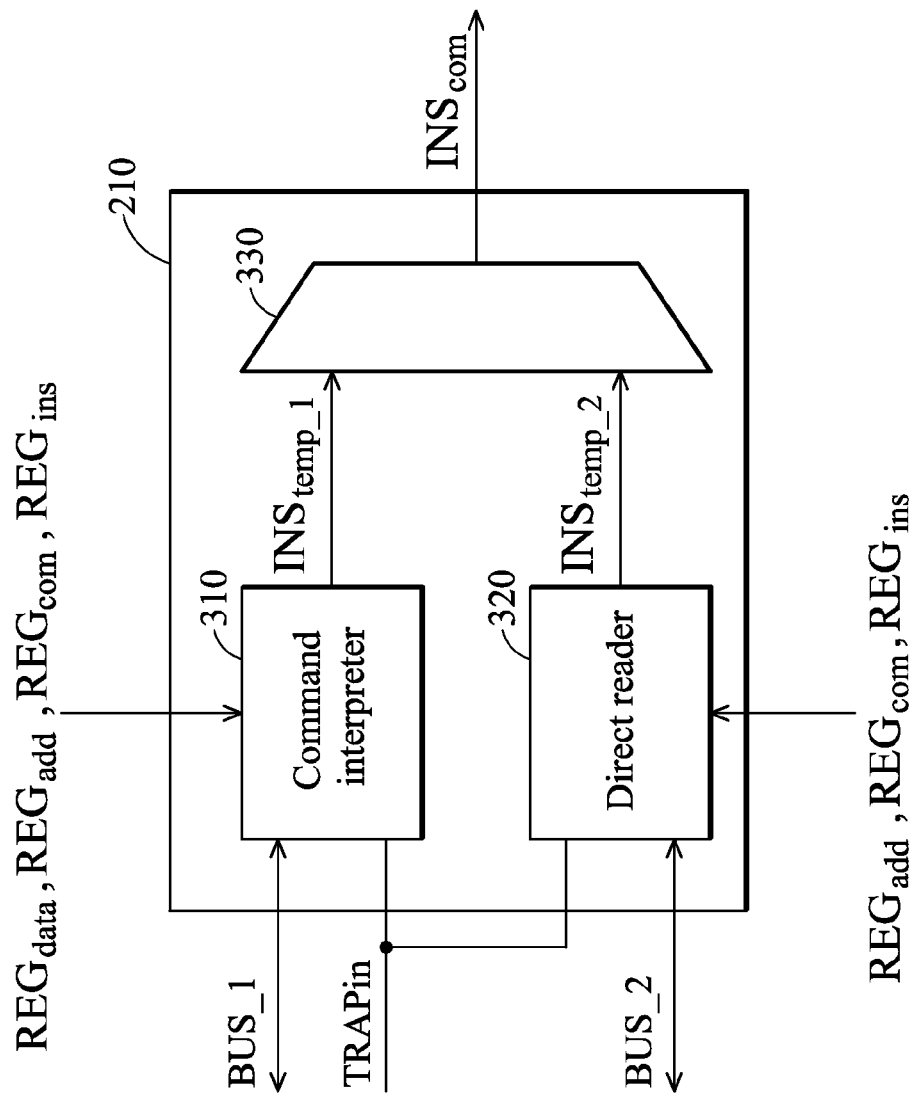
FIG. 3A shows a block diagram of the command controller according to an embodiment of the invention.

Please refer to FIG. 3A. FIG. 3A shows a block diagram of the command controller 210. The command controller 210 comprises a direct reader 320, a command interpreter 310, and a multiplexer (MUX) 330. The direct reader 320 processes the read command $COM_{read}$ (from bus BUS_2) to generate an instruction $INS_{temp\_2}$ according to the trapping input $TRAP_{in}$. For example, if the trapping input $TRAP_{in}$ from the vendor is ST, then the direct reader 320 generates the interpreted instruction $INS_{temp\_2}$ equal to "03h". If the trapping input $TRAP_{in}$ from the vendor is ATMEL, then the direct reader 320 generates the interpreted instruction $INS_{temp\_2}$ equal to "E8h". The command interpreter 310 also interprets the access command $COM_{access}$ (from bus BUS_1) to generate another instruction $INS_{temp\_1}$ according to the trapping input $TRAP_{in}$. For example, in a read status access, if the trapping input $TRAP_{in}$ from the vendor is ST, then the command interpreter 310 generates the interpreted instruction $INS_{temp\_1}$ equal to "05h". If the trapping input $TRAP_{in}$ from the vendor is ATMEL, then the command interpreter 310 generates the interpreted instruction $INS_{temp\_1}$ equal to "D7h". The MUX 330 selects one instruction from the instructions $INS_{temp\_1}$ and $INS_{temp\_2}$ to be the interpreted instruction $INS_{com}$. After the interpreted instruction is generated, the corresponding flash data $REG_{data}$ and the flash address $REG_{add}$ will be sent in turn. Though in the embodiments above, the direct reader 320 and the command interpreter 310 generate the instructions according to the trapping input $TRAP_{in}$, it should be noted that the instructions could also be generated without referring to trapping input $TRAP_{in}$.

In the case of access command $COM_{access}$ (through bus BUS_1), if the corresponding action handled by the command interpreter 310 is to perform reading (determined by the register value $REG_{com}$), the command interpreter 310 sends the interpreted instruction $INS_{temp\_1}$ (according to the trapping input $TRAP_{in}$ and the register value $REG_{ins}$), and the reading address from register value $REG_{add}$. Similarly, if the corresponding action is to perform writing (determined by the register value $REG_{com}$), the command interpreter 310 sends the interpreted instruction $INS_{temp\_1}$ (according to the trapping input $TRAP_{in}$ and the register value $REG_{ins}$), the writing data from register value $REG_{data}$, and the writing address from register value $REG_{add}$.

In the case of read command $COM_{read}$ (through bus BUS_2), the corresponding action handled by the direct reader 320 is to perform reading. The direct reader 320 sends the interpreted instruction $INS_{temp\_2}$ (according to the trapping input $TRAP_{in}$ and the register value $REG_{ins}$), and the reading address from register value $REG_{add}$.

Figure 3B:
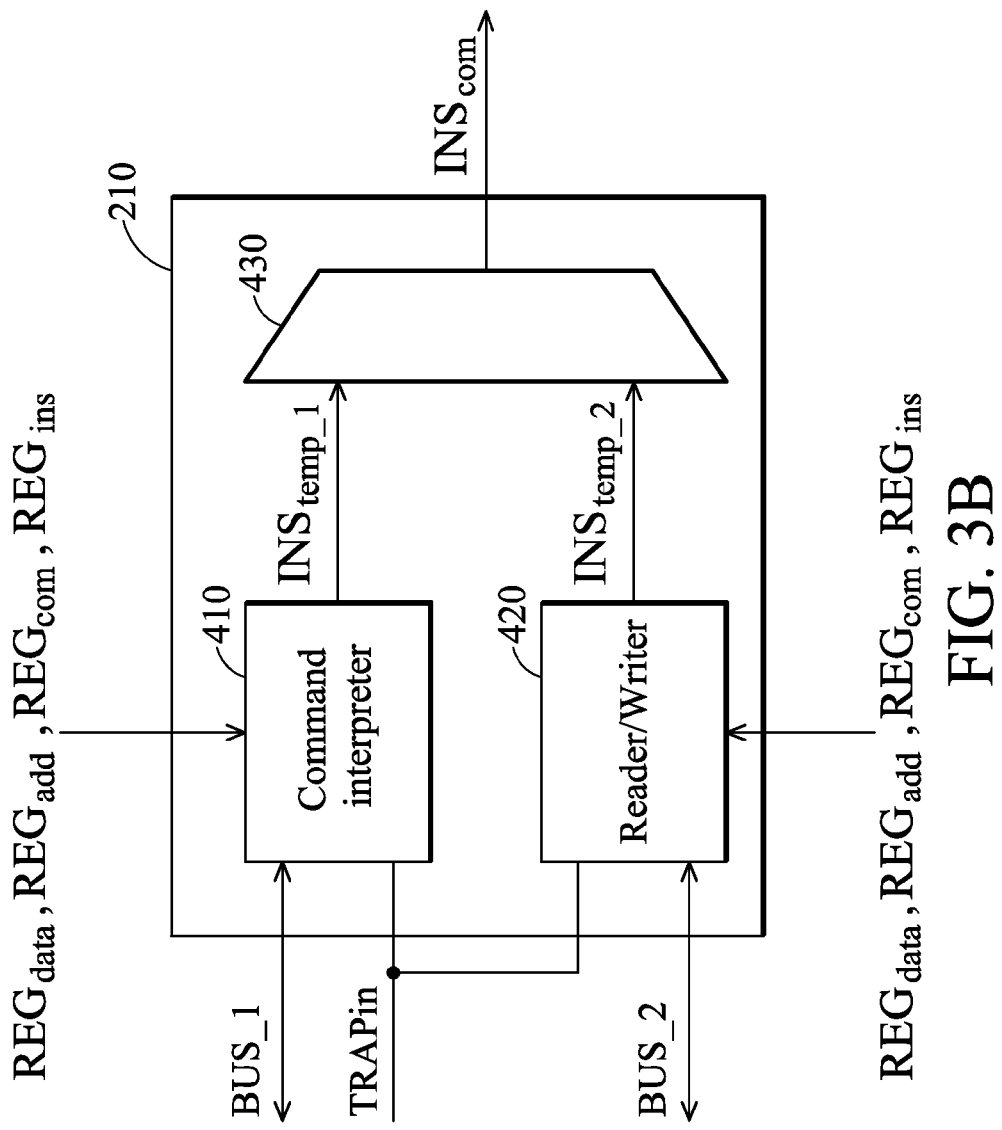
FIG. 3B shows another block diagram of the command controller according to another embodiment of the invention.

Please refer to FIG. 3B. FIG. 3B shows another block diagram of the command controller 210. Compared with the previous one in FIG. 3A, the key difference is that the direct reader 320 is replaced by the reader/writer 420. The reader/writer 420 not only can handle the read command $COM_{read}$ but also the write command $COM_{write}$.

In one embodiment, the command interpreter 310 may only process write commands from the processor 120. The processor 120 will execute write command and store data to be written, writing address, and/or instruction into one or more than one storage component, such as registers 220, 230 and 250 or static random access memory (SRAM). The command interpreter 310 will generate a write instruction, data to be written and writing address for parallel-serial shift register 260 to shift.

In another embodiment, please refer to FIG. 2A, first the processor 120 may execute write command and store data to be written, writing address, and/or instruction into one or more than one storage component. Then the processor 120 or the command interpreter 310 may trigger the parallel-serial shift register 260 to convert the data to be written, writing address, and/or instruction from a parallel form to a serial form and shifts them to the serial flash 110.

Figure 3C:
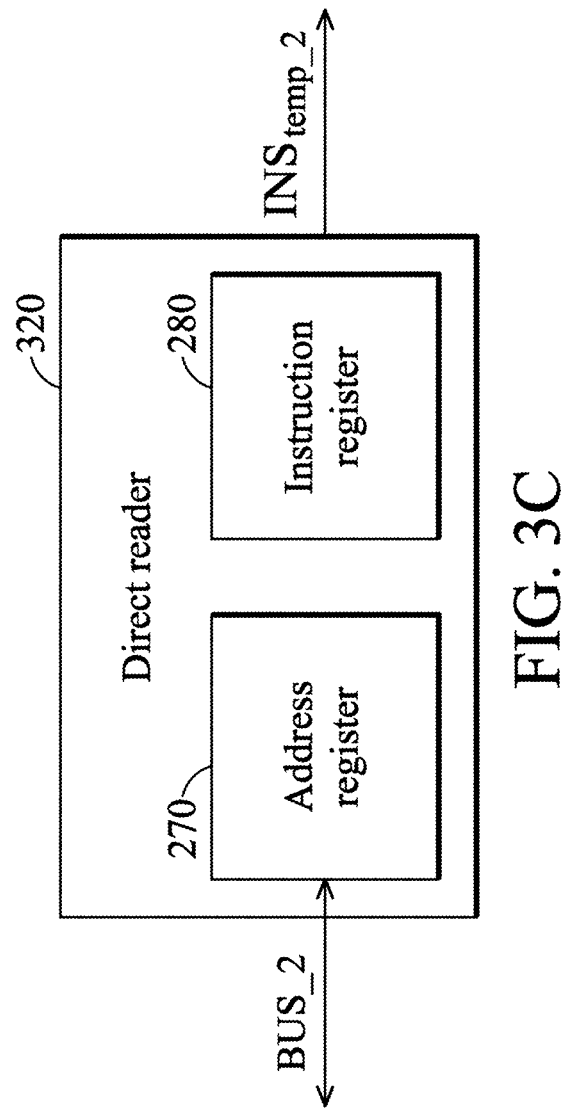
FIG. 3C shows a block diagram of the direct reader according to an embodiment of the invention.

In another embodiment, the direct reader 320 may process read commands only. The direct reader 320 may implement a read command for the processor 120. Please refer to FIG. 3C, the processor 120 may send an address of data to be read to the direct reader 320 via, for example, BUS_2. The direct reader 320 may then store the address and/or a reading instruction into the address register 270 and/or instruction register 280. Then the processor 120 or the direct reader 320 may trigger the parallel-serial shift register 260 to convert the address and/or reading instruction from a parallel form to a serial form and shifts them to the serial flash 110.

Figure 3D:
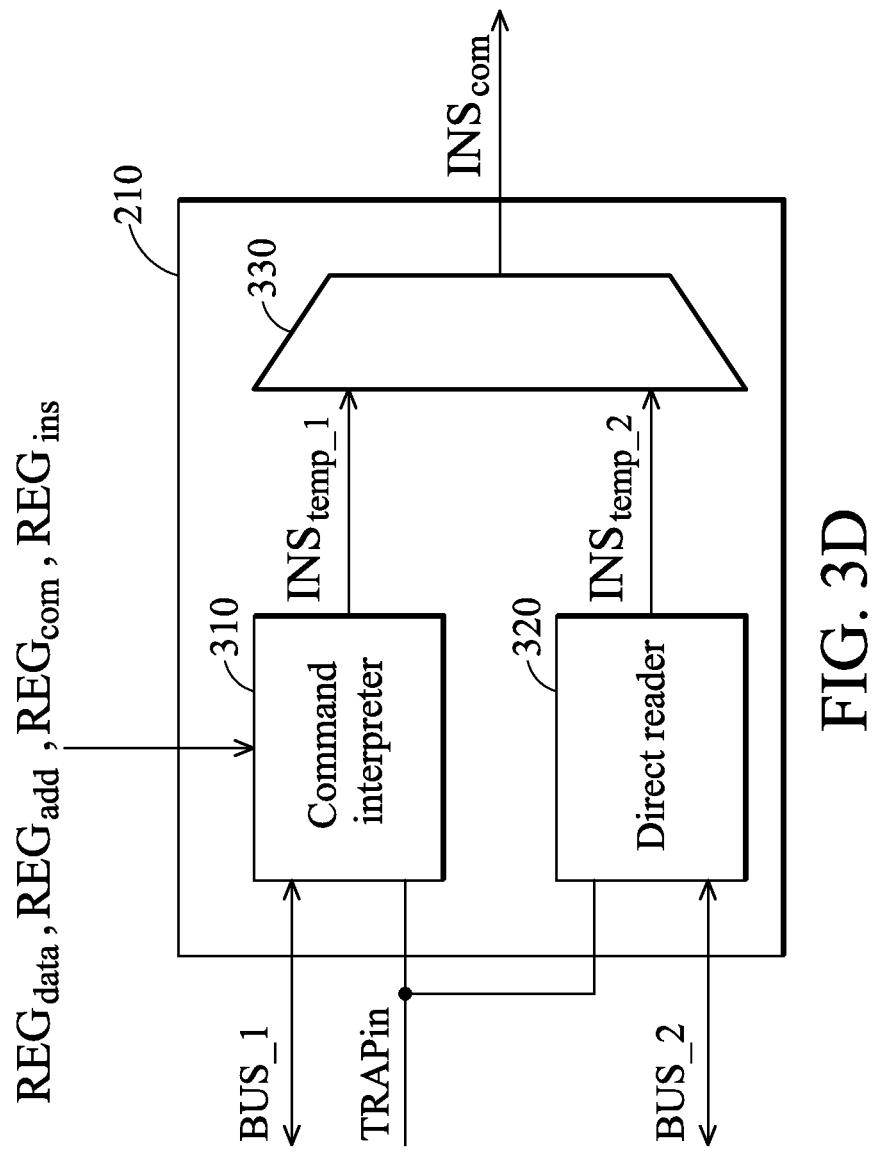
FIG. 3D shows yet another block diagram of the command controller according to yet another embodiment of the invention.

In yet another embodiment, please refer to FIGS. 2A and 3D, the direct reader 320 may implement a read command for the processor 120 in another way. The processor 120 may send an address of data to be read to the direct reader 320 via, for example, BUS_2. The direct reader 320 may then store the address and/or a reading instruction into the address register 230 and/or instruction register 250. Then the processor 120 or the direct reader 320 may trigger the parallel-serial shift register 260 to convert the address and/or reading instruction from a parallel form to a serial form and shifts them to the serial flash 110.

Figure 4A:
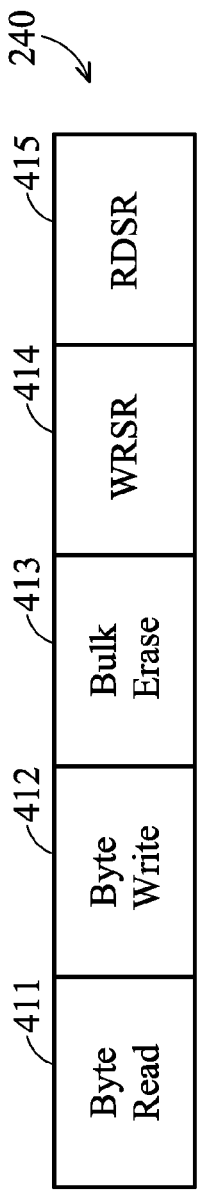
FIG. 4A shows a schematic diagram of the command register in FIG. 2.
Figure 4B:
Figure 4C:
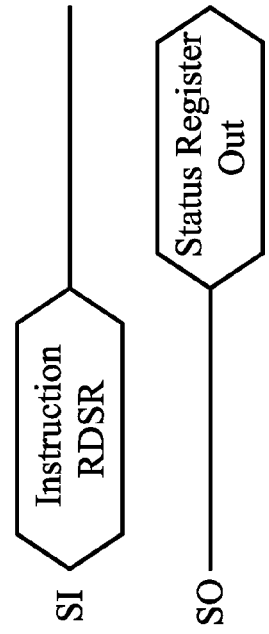

Please refer to FIGS. 4A-4E. FIG. 4A shows a schematic diagram of the command register 240 in FIG. 2. FIGS. 4B-4E show schematic diagrams of a series of instructions, data, and addresses sent to the serial flash 110 in different operations (e.g. bulk erase, byte read, byte write . . . ) of the command controller 210. The command register 240 comprises a byte read segment 411, a byte write segment 412, a bulk erase segment 413, a WRSR (write status register) segment 414, and a RDSR (read status register) segment 415. For example, the size of each segment in the register 240 is equal to one bit. In FIG. 4B, a bulk erase instruction is generated after the bulk erase segment 413 is set by the processor 120. The command interpreter 320 processes the bulk erase access command $COM_{access}$ to output the bulk erase instruction $INS_{com}$ according to the trapping input $TRAP_{in}$. No other flash data $REG_{data}$ or flash address $REG_{add}$ is followed with the bulk erase instruction $INS_{com}$ and sent to the serial flash 110. In FIG. 4C, a read status instruction is generated after the RDSR segment 415 is set by the processor 120. The command interpreter 310 processes the RDSR command $COM_{access}$ to output RDSR instruction $INS_{com}$ according to trapping input $TRAP_{in}$. No other flash data $REG_{data}$ or $REG_{add}$ is followed with the RDSR instruction $INS_{com}$ and sent to the serial flash 110. After the RDSR command $COM_{access}$ is triggered and completed, the return status is available from the serial flash 110. In FIG. 4D, a write status instruction is generated after the WRSR segment 414 is set by the processor 120. The command interpreter 320 processes the WRSR command $COM_{access}$ to output WRSR instruction $INS_{com}$ according to the trapping input $TRAP_{in}$. In FIG. 4E, a byte program instruction is generated after the byte write segment 412 is set by the processor 120. The command interpreter 320 processes the byte write command $COM_{access}$ to output byte write instruction $INS_{com}$ according to the trapping input $TRAP_{in}$. After the access command $COM_{access}$ is triggered, a series comprising instruction, address, data and handshaking is generated and sent to the serial flash 110. Then the byte data can be written to the assigned address of the serial flash 110.

From the above description it is clear that the command controller can translate various commands to corresponding instructions even though these instructions are based on different instruction sets provided by different serial flash vendors. Thus compatibility issues can be solved. A detailed description of the prefetch buffer 170 (in FIG. 1) is provided in the following.

Though in the embodiments above, the data to be written, address and/or instruction are put in registers, it should be noted that they can be stored in any other storage components suitable for storing data, address and/or instruction. For example, the storage component could also be static random access memory (SRAM).

In another embodiment, the direct reader 320 can be implemented by hardware, thereby the read operation, which may frequently occur in the embedded system 100, can be completed faster. Besides, the processor 120 may not start without executing program, however, serial flash 110 does not support execute in place (XIP). A direct reader 320 implemented by hardware can implement read command for the processor 120 and obtain program from the serial flash 110 for the processor 120 to execute, thus helps processor 120 start.

Figure 5:
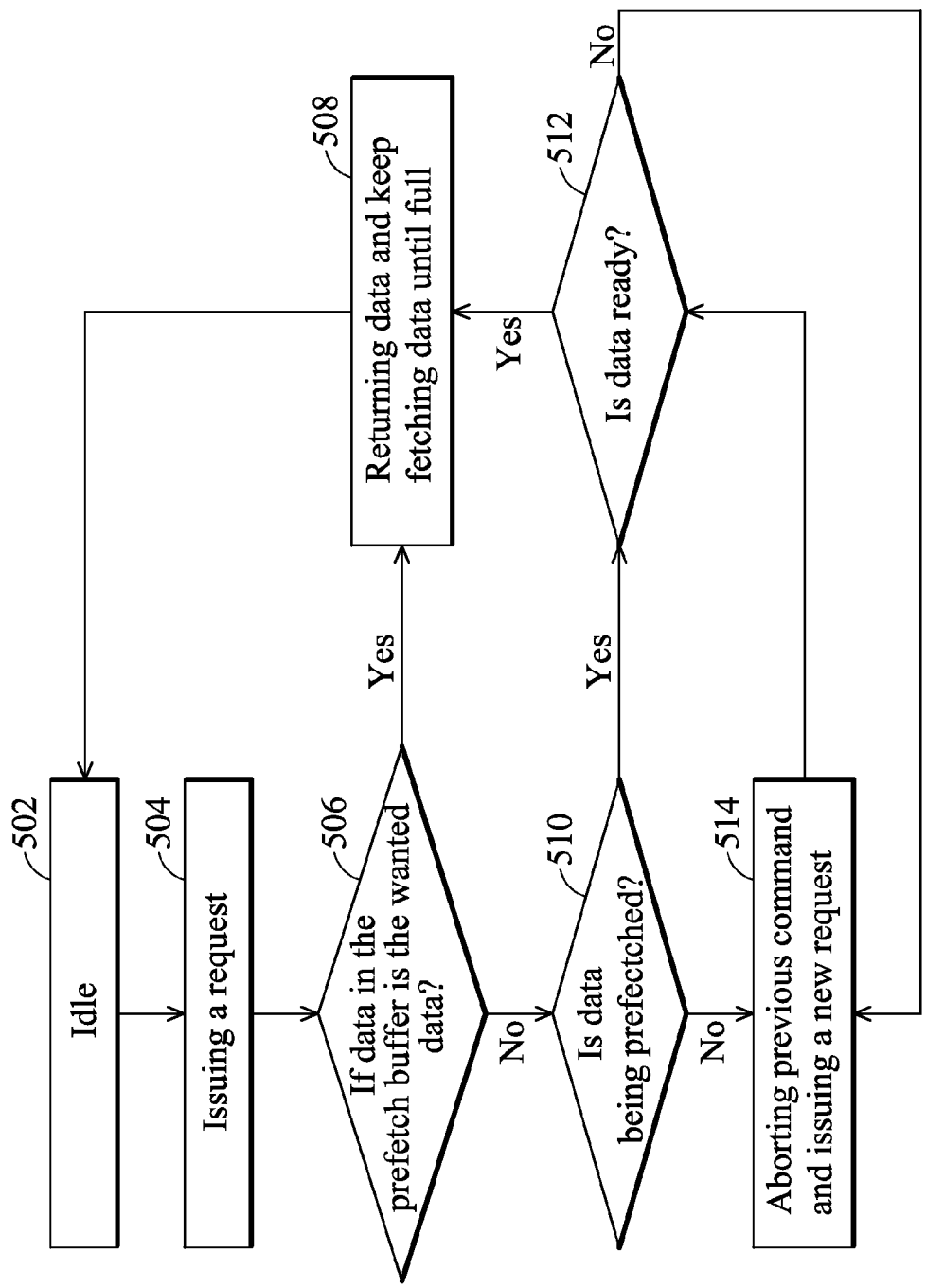
FIG. 5 is a flow chart of a prefetch buffer reading control method applied to an embedded system.

Please refer to FIG. 5. FIG. 5 is a flow chart of a prefetch buffer reading control method applied to an embedded system. Steps of the method are given in the following.

Step 502: The prefetch buffer is idle.
Step 504: A processor or any other access device issues a request to a serial flash request arbiter to read wanted data.
Step 506: The prefetch buffer controller determines if data in the prefetch buffer is the wanted data. If yes, proceed to step 508; Otherwise proceed to step 510.

Step 508: The prefetch buffer controller returns data in the prefetch buffer to the processor or any other access and continues fetching until the prefetch buffer is full.

Step 510: The prefetch buffer controller determines if data is being fetched from a serial flash and if it is ready to be read by the processor or any other access device. If yes, proceed to step 512; Otherwise proceed to step 514.

Step 512: Wait and determine whether data is ready. If yes, proceed to step 508; Otherwise proceed to step 514.

Step 514: Abort previous command if present and issue a new request to a serial flash interface.

Figure 6:
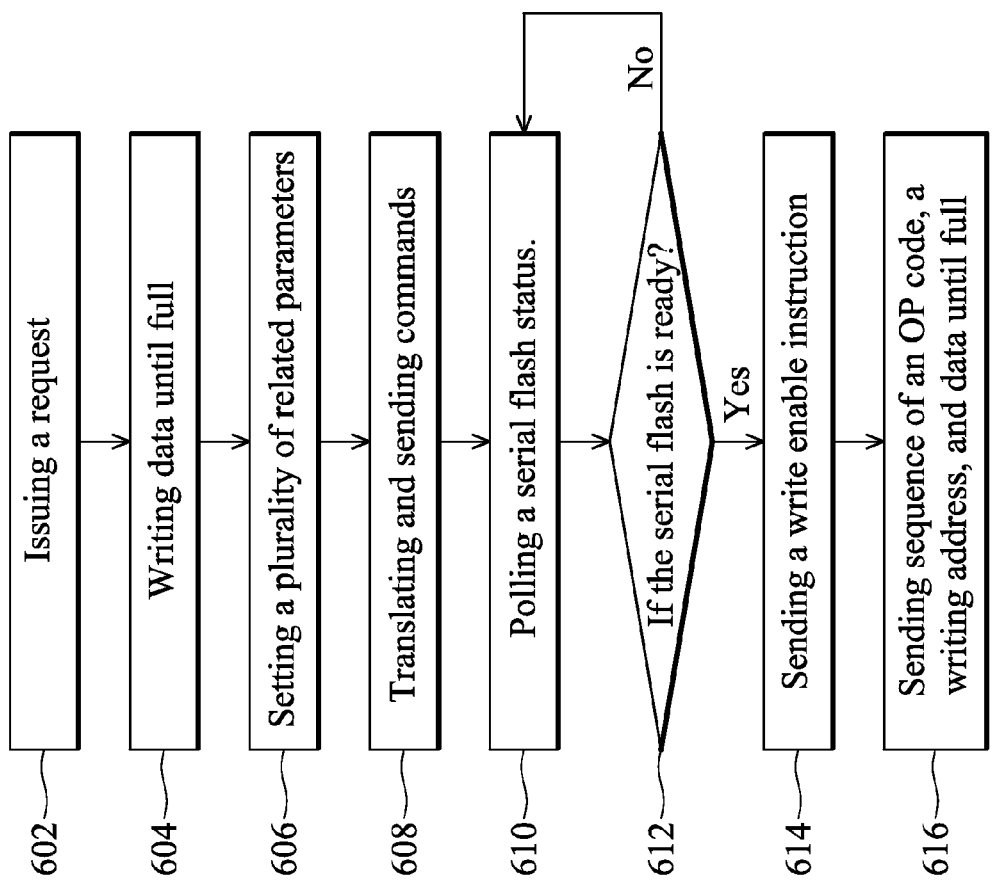
FIG. 6 is a flow chart of a prefetch buffer writing control method applied to an embedded system.

Please refer to FIG. 6. FIG. 6 is a flow chart of a prefetch buffer writing control method applied to an embedded system. Steps of the method are given in the following.

Step 602: A processor or any other access device issues a request to a serial flash request arbiter to write data to a serial flash.

Step 604: The processor or any other access device writes data to the prefetch buffer until full.

Step 606: The processor or any other access device sets a plurality of related parameters (e.g. a written address or a serial flash vendor).

Step 608: The processor or any other access device triggers a command controller to translate and send commands to the serial flash.

Step 610: The command controller polls a serial flash status.

Step 612: Determine if the serial flash is ready. If yes, proceed to step 614; Otherwise, proceed to step 612.

Step 614: The command controller sends a write enable instruction to the serial flash.

Step 616: The command controller sends sequence of an interpreted instruction (OP code), a writing address, and data until the prefetch buffer is full.

Compared with the related art, the prefetch buffer of the present invention can translate several single access requests into a burst access. Hence access frequency decreases and performance is increased. Additionally, the command controller can translate various commands to corresponding instructions even though these instructions are provided by different instruction sets from different serial flash vendors.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An embedded system comprising a processor, an access device and a serial flash, wherein the processor and the access device send commands to read data from or write data to the serial flash, and the embedded system further comprises:
    a serial flash request arbiter, coupled to the processor and the access device;
    a multiplexer, coupled to the serial flash, operative to selectively shift one instruction from a first instruction and a second instruction to the serial flash for accessing the serial flash;
    a command interpreter, coupled between the processor and the multiplexer, and operative to interpret a first command to generate the first instruction, wherein the first command is from the processor and not through the serial flash request arbiter;
    a direct reader, coupled between the serial flash request arbiter and the multiplexer, operative to process a second command to generate the second instruction, wherein the second command can be from at least one of the processor and the access device through the serial flash request arbiter; and
    a prefetch buffer, operative to temporarily store data before data read from the serial flash is received by the processor or the access device and/or before data is written to the serial flash.

2. The embedded system according to claim 1, wherein the direct reader processes the second command to generate the second instruction equal to a first value.

3. The embedded system according to claim 2, wherein the first value is 03h or E8h.

4. The embedded system according to claim 1, further comprising:
    a parallel-serial shift register coupled between the command interpreter, the direct reader and the serial flash for converting the first instruction and the second instruction from parallel form to serial form and shifting the converted instruction to the serial flash.

5. The embedded system according to claim 1, wherein the command interpreter interprets a read status command to generate a read status instruction comprising a read status register instruction that is equal to a second value.

6. The embedded system according to claim 5, wherein the second value is 05h or D7h.

7. The embedded system according to claim 1, wherein there are various first commands comprising a bulk erase command, a read status command, a write status command, and a byte program command.

8. The embedded system according to claim 1, wherein if data in the prefetch buffer is wanted by the processor or the access device, the processor or the access device reads data from the prefetch buffer and data is continuously transmitted to the prefetch buffer till the prefetch buffer is full; otherwise wanted data from the serial flash is transmitted to the prefetch buffer first.

9. The embedded system according to claim 1, wherein the processor or the access device writes data to the prefetch buffer until the prefetch buffer is full, and writes data to the serial flash until the prefetch buffer is empty.

10. The embedded system according to claim 1, wherein the second command is a read command from the processor, and a storage component is used to store an address of data to be read in response to the read command.

11. The embedded system according to claim 10, wherein the storage component is an address register, the direct reader sets the address register according to the address of data to be read sent by the processor.

12. The embedded system according to claim 10, wherein the storage component is a static random access memory (SRAM) in the embedded system, the direct reader stores the address of data to be read sent by the processor in the SRAM.

13. The embedded system according to claim 10, further comprising:
    a parallel-serial shift register coupled to the serial flash for converting the address in the storage component from parallel form to serial form and shifting the converted address to the serial flash.

14. The embedded system according to claim 10, wherein implementing the read command includes storing in a storage component a read instruction.

15. The embedded system according to claim 14, wherein the storage component is an instruction register in the embedded system, the direct reader sets the instruction register for the processor.

16. The embedded system according to claim 14, wherein the storage component is a static random access memory (SRAM) in the embedded system, the direct reader stores the read instruction in the SRAM for the processor.

17. The embedded system according to claim 1, wherein the direct reader is implemented by hardware.

* * * * *